United States Patent
Bradley et al.

(10) Patent No.: US 6,934,716 B2
(45) Date of Patent: Aug. 23, 2005

(54) METHODS AND APPARATUS FOR MANAGEMENT OF WORK OBJECTS

(75) Inventors: Donald A. Bradley, Raleigh, NC (US); Robert P. Noble, Wake Forest, NC (US); Kevin Universal, Raleigh, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 491 days.

(21) Appl. No.: 10/063,061

(22) Filed: Mar. 15, 2002

(65) Prior Publication Data

US 2003/0177128 A1 Sep. 18, 2003

(51) Int. Cl.[7] .................................................. G06F 7/00
(52) U.S. Cl. .................. 707/103 R; 707/100; 707/102; 707/104.1; 707/204; 709/203; 709/224
(58) Field of Search ...................... 707/1–4, 100–103 R, 707/104.1, 203, 206; 715/514, 515, 530, 538; 709/203, 224; 705/8, 14, 53

(56) References Cited

U.S. PATENT DOCUMENTS

| | | | | |
|---|---|---|---|---|
| 5,241,645 A | * | 8/1993 | Cimral et al. .................. 703/2 |
| 5,488,721 A | * | 1/1996 | Rich et al. ............... 707/103 R |
| 5,758,153 A | * | 5/1998 | Atsatt et al. ............ 707/103 R |
| 5,768,578 A | * | 6/1998 | Kirk et al. ................... 707/100 |
| 5,983,225 A | * | 11/1999 | Anfindsen ...................... 707/8 |
| 5,999,664 A | * | 12/1999 | Mahoney et al. ........... 382/305 |
| 6,343,339 B1 | * | 1/2002 | Daynes ....................... 710/200 |
| 6,449,627 B1 | * | 9/2002 | Baer et al. .................. 715/514 |
| 2003/0004771 A1 | * | 1/2003 | Yaung ........................... 705/8 |

* cited by examiner

Primary Examiner—Charles Rones
Assistant Examiner—Jacques Veillard
(74) Attorney, Agent, or Firm—Priest & Goldstein, PLLC (57) ABSTRACT

Techniques for managing work objects are described. These techniques include presenting an interface to a user allowing user specification of a category of work objects. The interface also allows user identification of one or more operations to be performed on the category of work objects. The operations may include searching for and unlocking groups of work objects, searching for and unlocking individual work objects, searching for and editing individual work objects and searching for and performing specified operations on categories of work objects comprising multiple work objects. Upon specification of the category of work objects and identification of the operations, the specified operations are performed on work objects included within the specified category.

18 Claims, 8 Drawing Sheets

METHODS AND APPARATUS FOR MANAGEMENT OF WORK OBJECTS

BACKGROUND OF INVENTION

The present invention relates generally to improvements in work flow management. More particularly, the invention relates to advantageous techniques for creating, examining and editing work objects.

Design and management of work flow in many enterprises often advantageously employs the use of work objects. Work objects are analogous to objects used in object-oriented programming. Each object is typically a set of data and instructions, wherein the data and instructions define the performance of a given set of actions. The data and instructions also characterize the object and govern its behavior. An object is typically defined by a set of data fields, which are used to define the specific element of work being processed or performed by the work object. The data fields are used as containers for information used during processing or to define the routing which the object takes as the flow of work proceeds. For example, a work object used to define the action of approving a loan application may include a data field defining an amount, for example, $500,000, above which approval must be sought from a higher authority. The work object may also contain instructions directing the routing of the work object, with the routing depending on whether the loan sought is above or below $500,000. If the loan sought is below $500,000, the object may remain at, for example, a local branch office. If the loan sought is greater than $500,000, the object may be referred to an approval authority at a central headquarters for processing by the authority and then routed back to the local branch office after processing by the approval authority.

Each work object also includes a set of instructions, which defines the operations which are to be undertaken and how the operations relate to the data fields. Each work object is preferably designed to provide data and functions needed by other work objects without a need for any work object to take into account the internal operation of another work object. Each work object simply interacts with other work objects to receive data and services and to provide data and services, without any awareness or need for awareness of the internal functioning of the work objects with which it interacts.

The use of work objects offers a number of advantages. If a task is separated into a number of work objects, that task can be distributed among a number of different persons or organizations, hereafter referred to as users, each working on the portion of the task defined by the work object, with data being transferred as defined by the work object. Moreover, as processing of a work object proceeds, different actions may be called for in order to continue processing of the object. For example, a work object may sequentially call for receiving and processing information from a customer, statistical analysis of the information received and preparation of a report on the information received from that customer and similar customers. These functions may suitably be performed by different users, each user specializing in one of the functions. As each function is reached, the work object may suitably be routed to the appropriate user so that processing may proceed. Routing of the work object may suitably be controlled by instructions contained within the work object.

Work flow can thus be followed from one work object to another, and from one user to another, without a need for each user working on the overall project to coordinate his or her activities with the others. Instead, coordination is accomplished through the definitions provided by the work objects and the design of work flow, which links work objects which must be processed sequentially, in coordination or in some other related fashion.

Work flow and work objects relating to a particular task may suitably be maintained on a computer or computer network, and work objects to be processed by various users may suitably be distributed to those users by sending the work objects to them or directing them to the work objects as maintained on a computer network and giving them access to the work objects in order to perform their functions.

Systems and networks used in the processing and hosting of work objects are frequently designed so that when a user starts to process a work object, the work object is treated as being in the possession of that user, and is locked to prevent access by others. When a work object is locked, no other user can have access to it until it is unlocked. This practice helps to prevent errors and conflicts by preventing two users from processing the work object with neither knowing that the other is processing it.

However, when a user has finished processing a work object, he or she may forget to unlock it. When work objects are distributed over a computer network, the objects may be distributed among users who are separated by great distances, so that it may be difficult to contact a user who has inadvertently left a work object locked in order to find out if the object is still being processed and to ask the user to unlock the object. In addition, a system event such as a network outage or timeout, a computer failure in one or more servers, a failure in an application being run on a server or workstation, or a workstation failure may have adverse effects in this environment. For example, these and similar events may cause the locking of one or more objects without a user's being aware that the objects were locked. As a result, such objects may be routed to new users in a locked state.

It would be advantageous to be able to search for locked work objects and to forcibly unlock those which appeared to have been inadvertently left locked. A large organization may maintain many work objects, many of which may have similar characteristics, so that it would be advantageous to be able to create search queries in order to retrieve work objects having similar characteristics and to unlock or perform other operations on a batch of work objects conforming to the terms of a query. In addition, work objects often require maintenance and editing in order to improve them and to update them in light of changed information. Editing, however, may change critical features of a work object unless a user has sufficient expertise to recognize a critical feature or value, or unless warned against making a critical change. It would also be advantageous, therefore, to be able to edit a work object but to be automatically warned when attempting to change critical features.

SUMMARY OF INVENTION

A work object manager according to an aspect of the present invention may comprise a user interface for receiving user inputs, the user interface allowing a user to construct queries defining a set of work objects on which simultaneous operations are to be performed and to specify an operation to be performed on the set of work objects and a plurality of operational modules operative to perform the specified operation on the defined set of work objects.

The operational modules may suitably comprise a batch unlock manager operative to receive a query specifying a range of locations to be searched for work objects, the query further specifying characteristics relating to locking of work objects. The batch unlock manager is operative to return work objects in the specified range of locations and having the specified lock characteristics and is further operative to simultaneously unlock the returned work objects upon a selection by the user.

The operational modules may also include a work object unlocker operative to receive a query identifying an individual work object and to retrieve and display a work object meeting the terms of the query. The work object unlocker unlocks the work object upon a user selection.

The operational modules may further include a work object editor operative to receive a query identifying an individual work object, to retrieve and display a work object meeting the terms of the query and to receive and accept user entries changing field values of fields in the work objects.

The operational modules may additionally include a batch operations manager operative to receive a query defining a category of work objects and a command specifying an operation to be performed on work objects meeting the terms of the query and to perform the specified operation upon work objects meeting the terms of the query.

A method of work object management according to an alternative aspect of the present invention comprises presenting an interface to a user allowing user specification of a category of work objects, the category comprising multiple work objects, the interface also allowing user identification of one or more operations to be performed on the category of work objects, the operations including searching for and unlocking groups of work objects, searching for and unlocking individual work objects, searching for and editing individual work objects and searching for and performing specified operations on categories of work objects comprising multiple work objects. Upon specification of the category of work objects and identification of the operations, the specified operations are performed on work objects included within the specified category.

A more complete understanding of the present invention, as well as further features and advantages of the invention, will be apparent from the following Detailed Description and the accompanying drawings.

DETAILED DESCRIPTION

Figure 1:
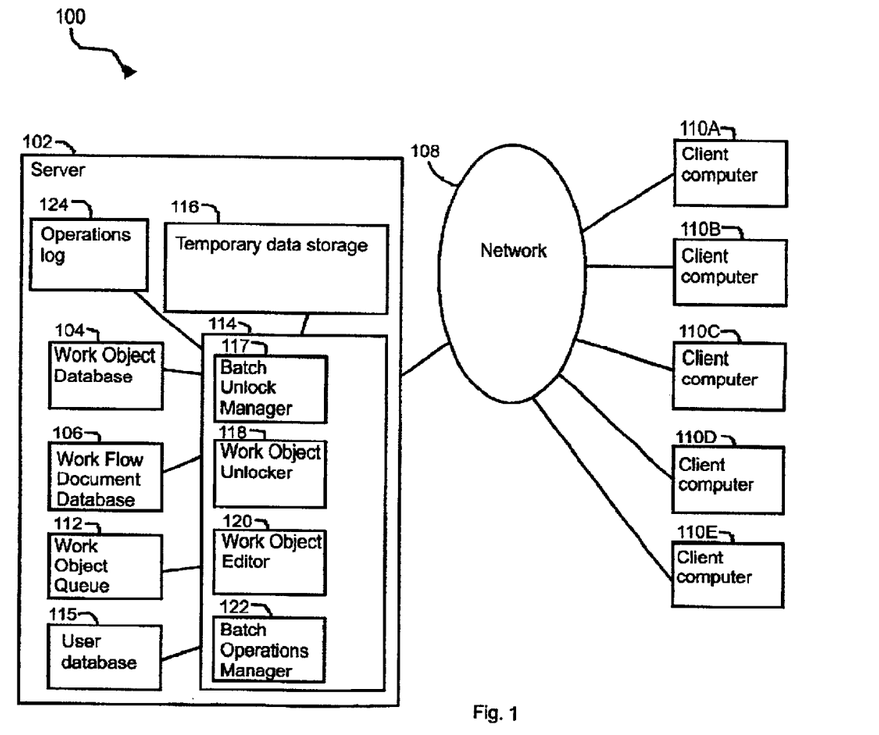
FIG. 1 illustrates a system for managing work objects according to an aspect of the present invention.

FIG. 1 illustrates a system 100 for managing work objects according to an aspect of the present invention. The system includes a central server 102 hosting a plurality of work objects. The work objects may reside in a work object database 104. In addition, a plurality of work flow documents may be hosted on the server 102. A work flow document is a sequential organization of work objects, including description and control of flow between the work objects, for accomplishment of a particular function. Work flow documents may be assembled by retrieving suitable work objects from the work object database 104, and organizing the work objects and flow between the work objects in order to create the work flow document. Work flow documents may suitably be stored in a work flow document database 106. For simplicity of illustration, all work objects and work flow documents are shown here as being hosted on the server 102, but it will be recognized that a system such as the system 100 may include a plurality of servers with more than one of the servers hosting work objects and work flow documents. For example, each of a number of different servers may host a work object queue similar to the work object queue 112, with each work object queue containing work objects hosted on the server. Work objects hosted in a queue such as the queue 112 may be objects which originated in the server hosting the queue, or may alternatively be objects which have been transmitted from an originating or intermediary server. A server hosting an object which has been transmitted to the server suitably holds the object in order to allow processing by users accessing the server.

The central server 102 is connected to a network 108, which is in turn connected to a plurality of client computers 110A–110E. Authorized users of the client computers 110A–110E are able to retrieve work flow documents from the work flow document database 106 in order to process the work objects included in the work flow documents. In addition, specific work objects in a work flow document can be assigned to specific users, who are then given access only to specified work objects within a particular work flow document. These users can process the work objects and submit the results of processing as instructed, or can place the work object into a work object queue, for retrieval and processing by a subsequent user. A work object queue is suitably maintained for each user or automatic process performing a particular function called for by a work object. For example, one or more work objects may include instructions for the scheduling of an appraisal in connection with a housing loan application. Such work objects may suitably be stored in the work object queue 112 as these instructions are encountered in the work objects, for retrieval by the user performing this function. Other similar work object queues may suitably be created for each function or instruction to be performed according to a work object. In this way, the work objects comprising a work flow document can distributed among users and transferred from one user to another as called for by the work flow document. Users can view and process work flow documents and work objects using suitable tools, for example the program VISUAL WORKFLO from FILENET.

Each work object may suitably be assigned to a work object class. Each work object class includes a specific category of work object having similar characteristics. The work object classes may be hierarchically organized, for example according to the generality of the operations they specify. A broad class may include a plurality of narrower classes. For example, a broad class of work objects having to do with processing insurance claims may include work objects calling for review of claims. This broad class may include narrower classes, for example work objects calling for review by a supervisor and work objects calling for review by an adjuster. Organizing work objects into classes and organizing the classes into a hierarchical structure simplifies management of the work objects.

A roster may suitably exist for each class of work objects, preferably stored in a work object database such as the database 104, a work object queue such as the queue 112 or both. Each roster includes references to all work objects belonging to the class described by the roster. A work object is located by performing a query on the roster for the class to which it belongs. Each work object may include a designation of a particular server as its home server, and may appear in a roster hosted on its home server. In addition, a server to which the work object has been transmitted for processing may suitably include a reference to the work object in a roster hosted on that server. Thus, a work object may be referred to by as many as two different rosters, one hosted on its home server and another hosted in the server in which it temporarily resides, for example as a result of having been transmitted for processing. A work object may be located by searching the rosters hosted on the servers on which it may appear, and may then be retrieved for processing once it is located.

In order to prevent conflicts between users, a work object is automatically locked when being processed by a user. The work object remains locked until released. If a user has finished processing a work object but forgets to release it, the work object remains locked and unavailable for other users under the normal operation of most work flow processing tools in common use. In addition, it is usually not clear when a work object is locked, because work objects tend to reside in the work object database 104, or as part of work flow documents in the work flow document database 106, where they remain until required for processing. In the ordinary course of processing work objects, therefore, a work object which has been inadvertently left locked will tend to remain locked until needed again. At this time, it will be discovered that the work object is locked and it must be unlocked, interfering with the flow of processing and causing inconvenience and loss of time. Tools exist for unlocking work objects, but these tools often require special expertise for their use, so that a typical user lacking such expertise cannot use a locked work object until he or she has contacted someone who is able to release the work object.

In order to overcome this problem, the system 100 includes a work object manager 114, which may suitably be hosted on the server 102, although it may suitably be hosted on any other server accessible using the network 108. The work object manager 114 has access to the work object database 104, all work object queues such as the work object queue 112 and a user database 115. When invoked by a user, the work object manager 114 retrieves user information about the user from the user database 115, in order to identify the privileges of the user. Preferably, the work object manager 114 can only be invoked by a user who has properly logged onto the network 108. Therefore, when the work object manager 114 is invoked, the invoking user is identified and it is a simple matter for the work object manager 114 to determine the user privileges of the invoking user. The work object manager 114 also has access to temporary data storage 116, to allow storage of work objects and other data for processing by the work object manager 114.

The work object manager 114 includes a batch unlock manager 117 for reporting work queue statistics and for processing unlock operations directed toward work objects belonging to a category of work objects, a work object unlocker 118 for unlocking an individual work object, a work object editor 120 for creating and editing an individual work object and a batch operations manager 122 performing operations on groups of work objects, with groups being suitably defined according to predetermined categories, or by queries designed by the user. The batch unlock manager 117, the work object unlocker 118, the work object editor 120 and the batch operations manager 122 suitably locate work objects by searching the various rosters located in work object databases and work object queues residing on various servers within the system 100, and may suitably perform operations on objects by retrieving objects, storing them in temporary data storage 116, performing the specified operations and returning them to the locations from which they were taken.

The batch unlock manager 117 reports on work queue statistics and performs batch lock operations. The batch unlock manager 117 allows a user to design queries to find locked work objects in a queue which meet other designated criteria, such as a particular age of a lock. These queries may be used to search the various queues, either directly or by examining rosters hosted on various servers. The batch unlock manager can also list all locked objects in the system 100 and can list all objects, locked or unlocked, in the system 100. To list all locked objects or all objects, the batch unlock manager 117 simply creates a query having the required parameters and conducts a search using this query.

The batch unlock manager 117 can also gather and display statistical information about work queue operations, such as the number of locked versus unlocked work objects, again by creating the necessary queries, searching using these queries and presenting the results obtained. This information is useful in determining the level of work being carried out in objects managed using the system 100, because in the normal case, a locked object is being actively worked on.

The work object unlocker 118 allows a user to retrieve an individual work object, for example by entering a query identifying the work object by name, determining whether the object is locked, and unlocking it if desired.

The work object editor 120 allows a user to edit field values belonging to an individual work object. The work object editor 120 allows the user to retrieve an individual work object, and to display the various fields included in the work object, along with the value presently residing in each field. The user can then enter new values in the fields if desired, and can perform other operations.

Figure 6:
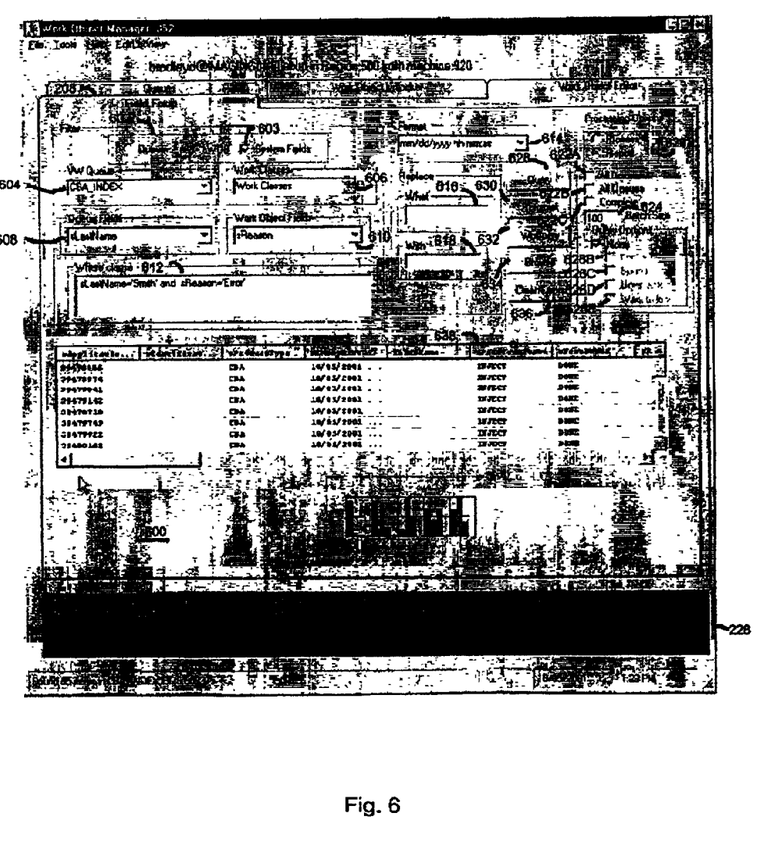
FIG. 6 illustrates a user interface for a batch operations manager according to an aspect of the present invention.

The batch operations manager 122 allows a user to retrieve, identify or perform simultaneous operations on groups of work objects meeting specified criteria. The user may specify operations to be performed and may then make selections defining the work objects on which operations are to be performed. Details of the operations which may be performed are illustrated in FIG. 6 and discussed in greater detail below.

The user may specify processing options, which identify the objects to be processed according to predefined criteria. Available options include the choice to process or report, which is a safety feature allowing the user to see what would happen as a result of the selected processing without performing the processing. Additional options, which define the objects on which processing or reporting is to be performed, are "all items," which performs the operation on all objects in a queue without being limited by query terms; "all queues," which performs the operation on all queues; "complete," which performs the operation on all objects in all queues; and "batch size," which specifies the grouping size on which the operation is to be performed. Operations are typically performed on successive groups of objects, with the number of objects in each successive group being defined by the "batch size" selection.

A user may design a query defining a group of work objects and may then select operations to be performed on work objects matching the terms of the query. The batch operations manager 122 also allows the user to select query options in order to add additional definition to the query, for example to remove restrictions which would otherwise be present, or to specify operations to be performed on objects matching the query. For example, suppose the user may design a query to specify all work objects on which work was last performed within the last six hours, and then select a query option. Available query options include "none," which returns all objects which match the query and are not locked, bound or specified as read only; "locked," which returns all objects that match the query specification, including locked objects; "bound", which returns all objects matching the query specification including those which are bound; and "unwriteable," which returns all matching objects including read-only objects. An additional available query option is "want to lock," which directs locking of all work objects matching the query.

The batch operations manager 122 allows a user to create a query in order to specify elements on which to perform operations, and to specify operations to be performed on the elements. Elements which may be specified include for example queues, queue fields, work objects or work object fields. A query may specify a plurality of queue fields. For example, a particular field may occur in a number of work objects, and a query may be constructed to specify a selected group of work objects, and a particular field occurring in some of all of the work objects. A group operation may be performed, in which a selected operation is performed on each occurrence of the specified element. Available operations include "reformat," which allows the format of a field in a work object to be changed. For example, many work objects may include a field specifying a time and date of the creation of the work object. By using the "reformat" operation, a user is able to change the format of the time and date specification, for example from an AM/PM specification for the hour to a 24-hour specification. This operation would be performed on all work objects matching the terms of a query and including the field on which the operation was to be performed. Other available operations include a "replace" operation, allowing the replacement of values in a work object field. A user would specify an original value to be replaced and the new value to replace it, and the new value would replace the original value in every work object meeting whatever other query terms were specified. Another available operation is the "Clean Errors" operation, which clears the most common work object error in a designated queue.

In order to prevent users from making errors which delete or otherwise corrupt critical elements of the work object, the work object editor 120 and the batch operations manager 122 preferably analyze user inputs to determine if the inputs affect critical elements of the work object. The analysis may suitably be performed by analyzing the effect of each user command before executing it and, if the command affects a critical element, presenting a confirmation request to the user, suitably in the form of a dialog box which describes the effect of the command for the user and requests that the user confirm the command. Another safety feature is provided by the fact that the work object manager is aware of the user privileges. If a user has insufficient privileges to perform a particular command, the work object manager 114 presents a dialog box informing the user that his or her privileges are insufficient to perform the selected command, and that the command will not be executed.

The work object manager 114 also has access to an operations log 124, in which are entered the search terms of each search, results of each search and operations performed on each work object during use of the work object manager 114.

Figure 2:
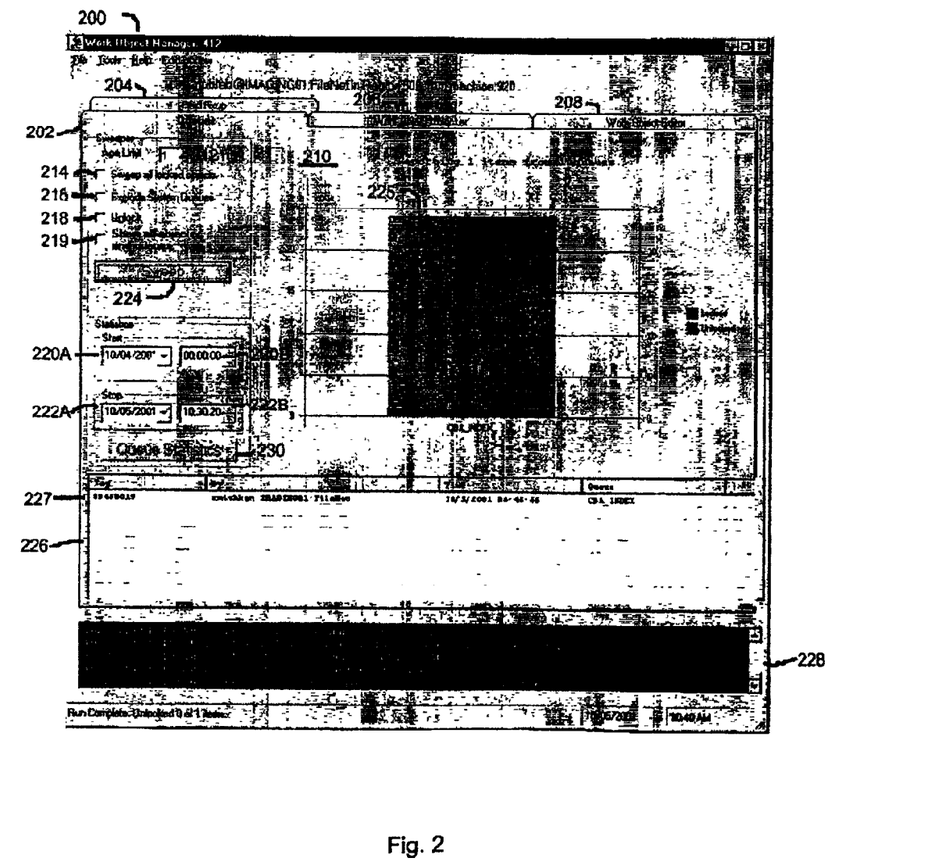
FIG. 2 illustrates a user interface for a batch unlock manager according to an aspect of the present invention.

FIG. 2 illustrates a work object manager user interface 200, allowing a user to control and receive results from the work object manager 114 of FIG. 1. The user interface 200 includes a "Queues" tab 202, which may be selected by a user to provide access to the batch unlock manager 117, a "Work Object Unlocker" tab 204, which provides access to the work object unlocker 118, a "Work Object Editor" tab 206, which provides access to the a work object editor 120 and a "Field Fixup" tab 208, which provides access to the batch operations manager 122. The interfaces accessed by the tabs 202-208 are superimposed on the work object manager interface 200, and selection of one of the tabs 202-208 brings forward an interface connected to that tab.

The user interface 200 is shown here with the "Queues" tab 202 selected, showing a batch unlock manager interface 210. The interface 210 allows a user to search a selected queue for work objects meeting specified criteria. The interface 210 includes an age limit field 212, allowing the user to enter the minimum age of an object to be returned as a search result, as well as checkboxes allowing the user to specify search criteria and operations. The checkboxes provided are the boxes 214–219, allowing a user to designate a search for all locked objects, to exclude system queues from a search, to unlock objects which are returned as search results, or to return all objects in all queues, respectively. In addition, the interface 210 includes fields 220A and 220B for entry of a beginning search date and time, respectively, and fields 222A and 222B for entry of an ending search date and time, respectively. In the illustrated case, the beginning and ending search dates and times have been automatically inserted based on the user's entry in the age limit field 212. The "Sweep" button 224 executes the search.

The interface 210 illustrates the results of the selected search. The search results include a graph 225 illustrating the total number of locked and unlocked objects present in the queue which has been searched. The search results also include a search results window 226, showing details of the object discovered in the search shown in the field 227. The interface 200 also includes an operations window 228, visible below the interface 210 and showing the actions undertaken during the search.

The interface 210 also allows a user to obtain queue statistics, illustrating details of objects in the queue which was searched. In order to obtain queue statistics, the user activates the "Queue Statistics" button 230.

Figure 3:
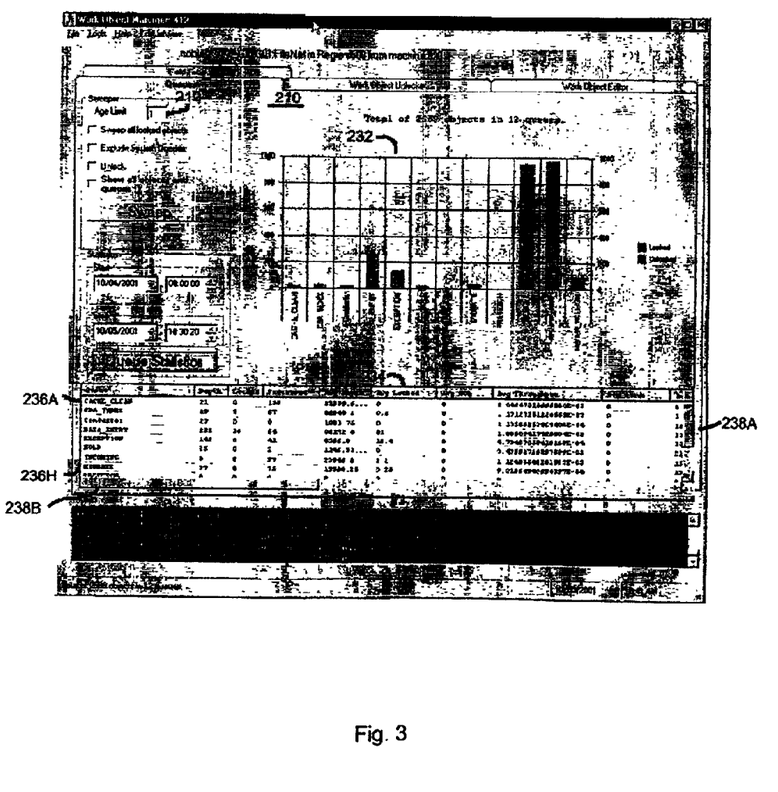
FIG. 3 illustrates additional aspects of a user interface for a batch unlock manager according to an aspect of the present invention.

FIG. 3 illustrates the interface 210, displaying queue statistics returned as a result a user selection to observe queue statistics for the search results illustrated in FIG. 2. The interface 210 shows a graph 232, showing the number of locked and unlocked objects for each queue which was searched. In addition, the interface shows a queue statistics window 234, with details of the various queues illustrated in the fields 236A–236H. Additional fields and areas of the window 234 can be revealed using the scrollbars 238A and 238B.

Figure 4:
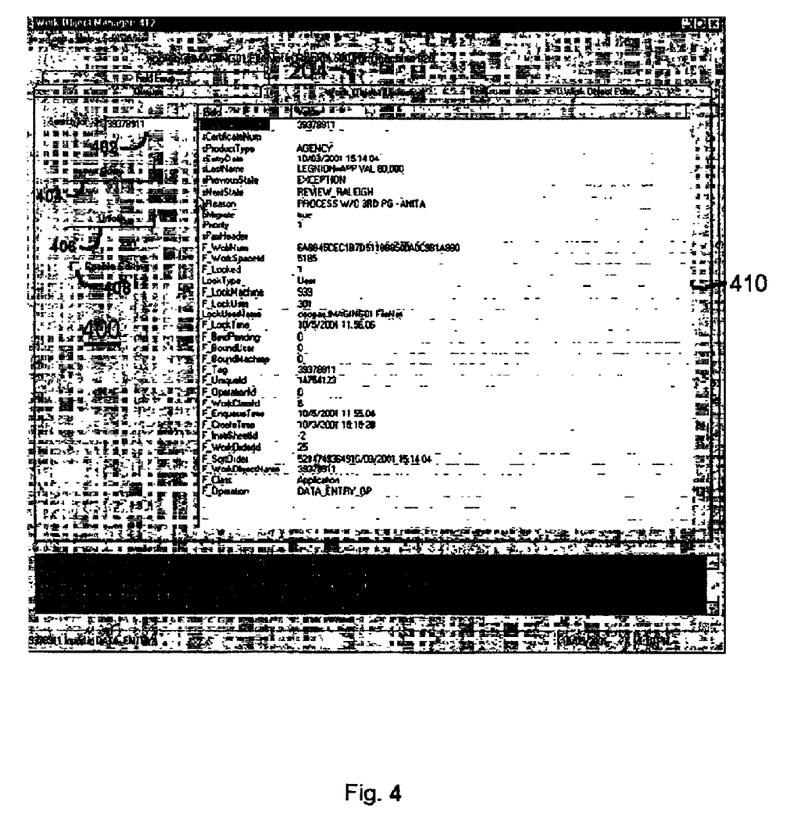
FIG. 4 illustrates a user interface for a work object unlocker according to an aspect of the present invention.

FIG. 4 illustrates the work object manager interface 200, in which the tab 204 has been selected to reveal a work object unlocker interface 400. The work object unlocker interface includes a query field 402, allowing a user entry of a specific work object for which a search is to be conducted. Also included are a "Query" button 404, for executing the search, and an "Unlock" button 406, for unlocking a work object retrieved in response to a query. In addition, the interface 400 includes an "Allow Editing" checkbox 408, which can be selected to allow a user to edit the fields of a work object which has been retrieved. Finally, the interface 400 includes a query results window 410, here illustrating the various fields of the work object retrieved by executing the query indicated in the query field 402.

Figure 5:
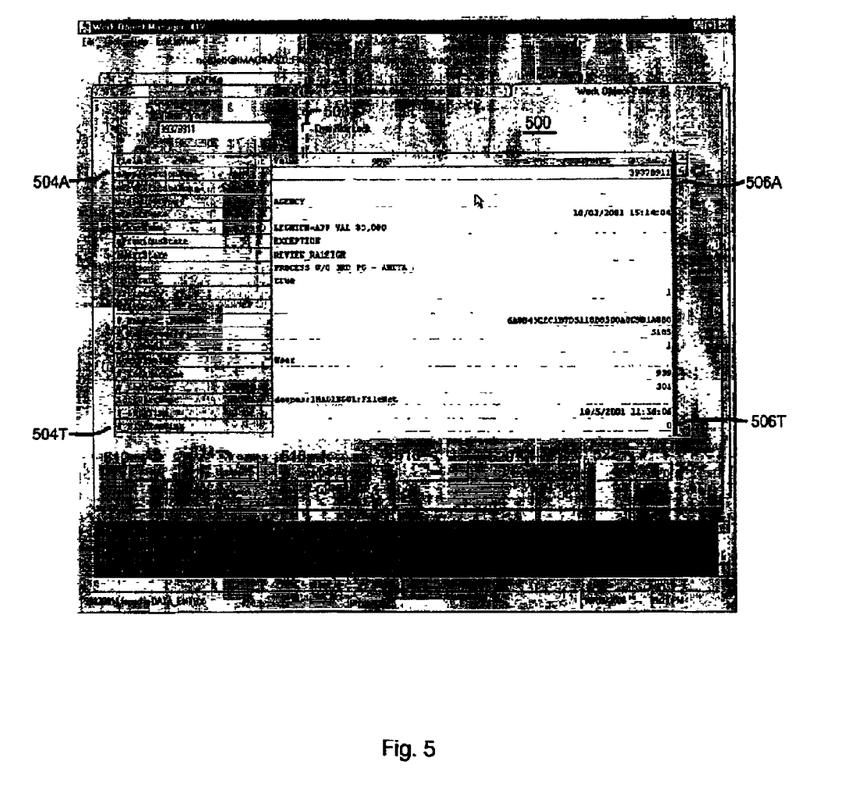
FIG. 5 illustrates a user interface for a work object editor according to an aspect of the present invention.

FIG. 5 illustrates a work object interface 500, displayed by selecting the tab 206. The interface 500 displays an editing window 502, including field names 504A–504T and field values 506A–506T showing the various fields of a work object retrieved as a result of a specific query entered using the interface 500. However, in addition to executing a query using the interface 500, it is also possible to select a work object retrieved using another component of the work object manager 114, and then select the tab 206 to display the work object interface. The editing window 502 will display the work object which was previously selected using the other module. For example, if a user is working with the batch unlock manager 117, he or she may execute a query resulting in the retrieval of a selection of work objects. If a user wishes to edit one of the work objects returned as a query result, the user may select that work object and then select the tab 206 in order to display the interface 500 in order to edit the work object.

A user may select the "Override Lock" checkbox 508 if desired. Selecting the checkbox 508 will allow editing of the object even if it is locked. In order to edit the object, the user simply makes appropriate entries in selected ones of the various field values 506A–506T visible in the editing window 502.

The interface 500 also includes various command buttons, allowing the user to perform selected operations. The "Find" button 510 executes a query in order to search for a work object identified in the query field 512. The "Update" button 514 enters any changes which have been made up until the time the button 514 is activated. The "Save/Dispatch" button 516 saves all changes which have been made and routes the object to the next user who is to perform work on the object. The "Lock" button 518 locks the work object and the "Unlock/Dispatch" button 520 unlocks the work object and routes it to the next user. The "Unlock" button 522 unlocks the work object, but retains it for further processing.

FIG. 6 illustrates a batch operations manager interface 600, displayed by selection of the "Field Fixup" tab 208. The interface 600 allows the user to design queries in order to designate work objects or groups of work objects, and to specify operations to be performed on the work objects meeting the terms of the query. The interface 600 includes a filter selector 602 for designating whether a query is to be applied to a queue or a work object, the filter selector 602 including a checkbox 603 for indicating whether or not the query is to be applied to system fields. The interface 600 also includes various selectors and fields for composing queries, including the "VW Queue" selector 604 for specifying a queue to which the operation is to be applied, a "Work Classes" selector 606 for specifying a class of work objects to which the query is to be applied, a "Queue Fields" selector 608 for designating a queue field to which the query is to be applied and a "Work Object Fields" selector 610 for designating a work object field for which the query is to be applied. The interface 600 also includes a "Where clause" field 612, which is a window in which a user can compose a query defining with more particularity the objects or fields to be operated on. When the user selects and executes an operation, the entries and selections in the various selectors and fields 602-612 are processed to create a query and the objects or fields meeting the terms of the query are subjected to the operation.

The interface 600 also includes fields and selectors allowing a user to designate an operation to be performed. A format selector 614 allows a user to select a desired format to be applied using a "Format" operation. "Replace" fields 616 and 618 allow the user to designate an original value to be replaced and a new value to replace the original value. The "Processing Options" selector 620 allows the user to designate whether the selected operation is to be actually performed, or whether the results are to be reported without performing the operation. The checkboxes 622A–622C allow the user to designate the scope of the operation, and the field 624 allows the user to designate a batch size for the operation. The "Query Options" checkboxes 626A–626E allow the user to refine the query.

The pushbuttons 628–636 allow the user to designate operations to be performed. The "Query" button 628 creates a work queue query using the selectors and fields 602–612, 622A–622C, 624 and 626A–626D, and returns the query results, which are then available to be operated on. The "Query" button 632 creates a work object query using the selectors and fields 602–612, 622A–622C, 624 and 626A–626D, and returns the query results, which are then available to be operated on. The "Reformat" button 630 applies the format chosen using the format selector 614 to the returned results. The "Clean Errors" button 636 repairs the most common work object error in the designated queue. The "Browse" button 634 allows the user to scroll through the work objects which have been returned as a result of a query.

The interface 610 also includes a query results window 638, showing the objects which have been returned as a result of a query and the operations which have been performed on the objects. Also visible is the operations window 228, showing the progress of the queries and operations.

Figure 7:
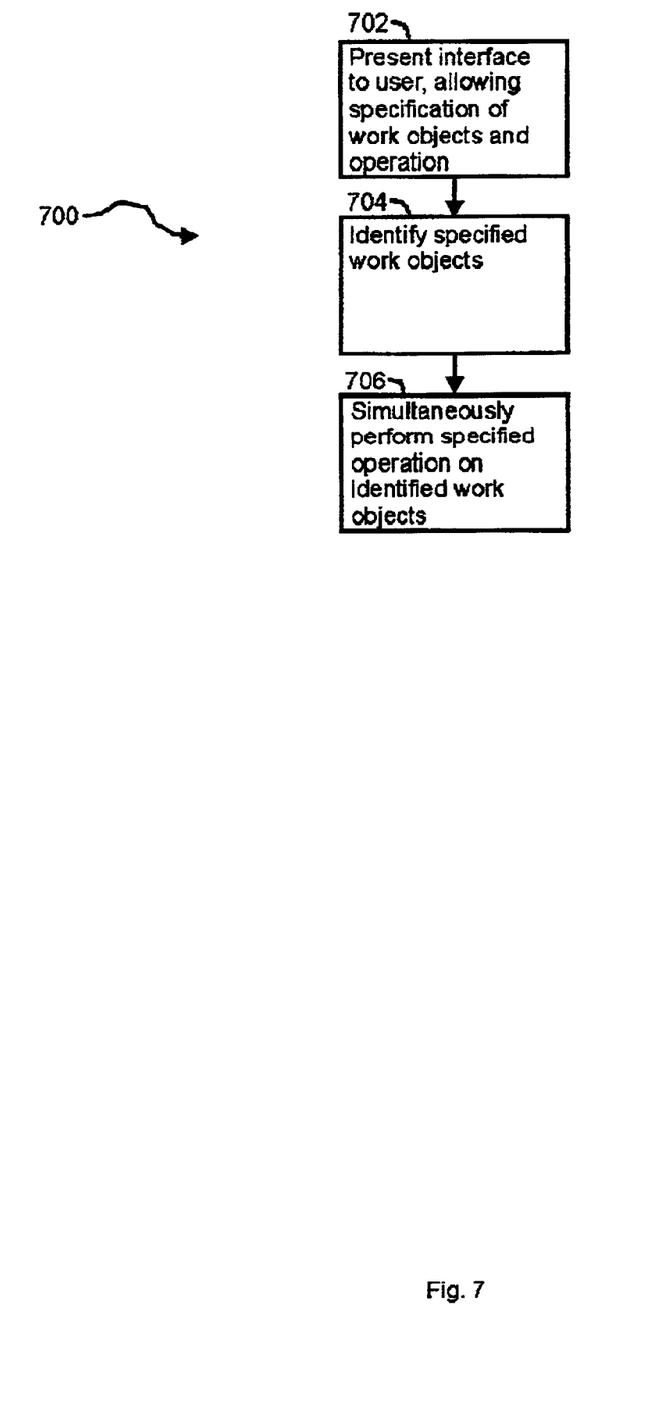
FIG. 7 illustrates a process of work object management according to an aspect of the present invention.

FIG. 7 illustrates a process 700 of work object management according to an aspect of the present invention. At step 702, an interface is presented to a user allowing user specification of a category of work objects, the category encompassing one or more objects. The interface also allows user identification of one or more operations to be performed on the work objects. At step 704, work objects belonging to the specified category are identified. At step 706, the identified operation is performed on the identified work objects.

Figure 8:
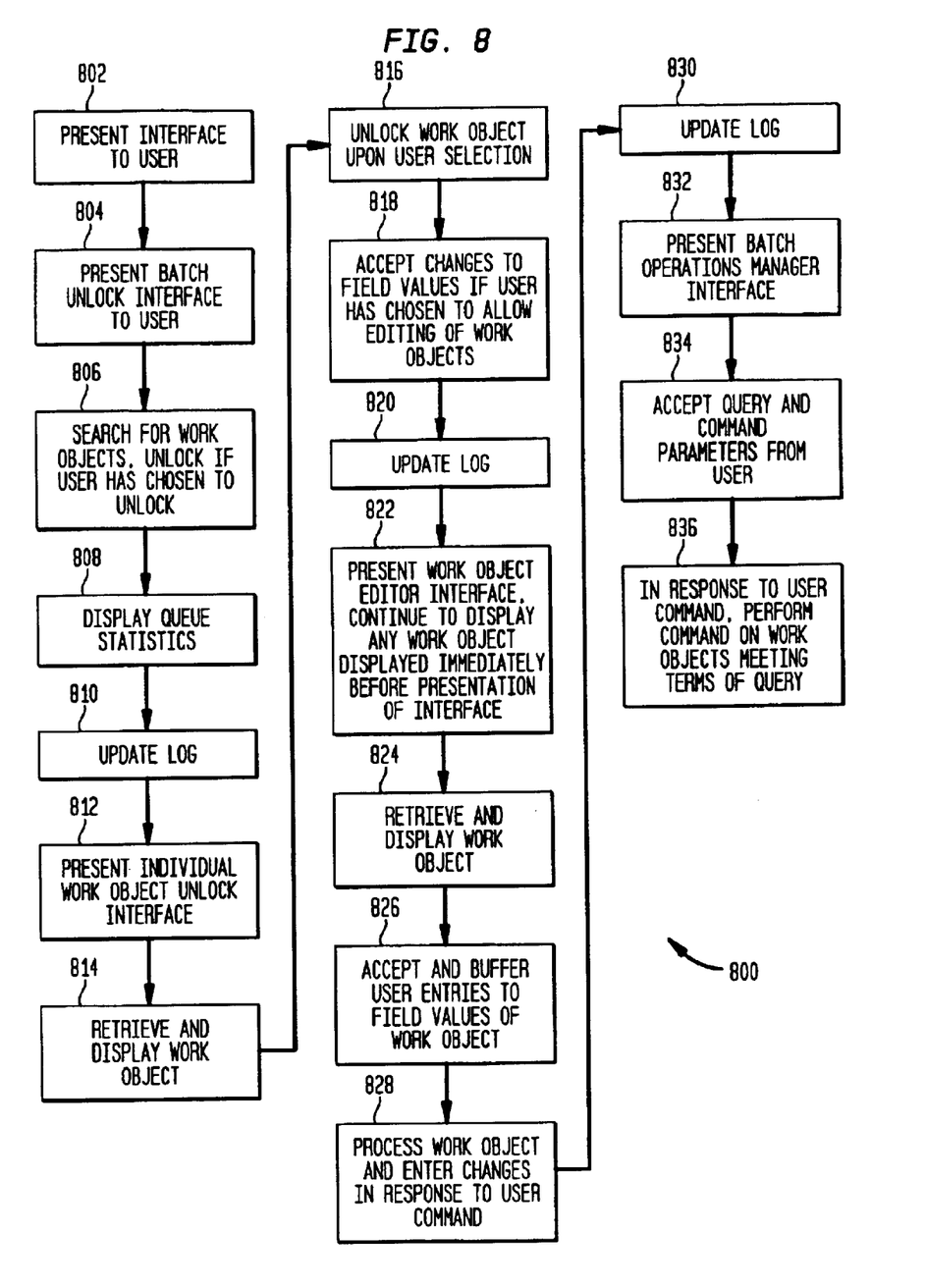
FIG. 8 illustrates additional details of a process of work object management according to an aspect of the present invention.

FIG. 8 illustrates a process 800 of work object management according to an aspect of the present invention. At step 802, a user is presented with an interface providing access to commands and information relating to work objects. The interface may suitably be similar to the interface 200 of FIG. 2, and may suitably allow the user to select any of a number of subordinate interfaces in order to perform particular categories of operations related to work objects. The subordinate interfaces may suitably be similar to the interfaces 210, 400, 500 and 600 of FIGS. 2, 4, 5 and 6, respectively. At step 804, upon a user selection of a batch unlock interface, a first subordinate interface is presented to the user, allowing a user to construct queries in order to search for locked objects meeting the terms of the queries, as well as to choose to unlock objects meeting the terms of the query. The query is suitably applied to one or more queues in which work objects awaiting processing or routing are stored. At step 806, upon the user's construction and submission of a query, a search is conducted for work objects conforming to the query and information about the work objects is displayed. If the user has selected to unlock objects, the objects are also unlocked. At step 808, upon a user's selection to display queue statistics, selected queues are searched and statistics relating to the work objects in the queues are displayed. At step 810, a log is updated to reflect the actions performed at steps 806 and 808.

At step 812, upon a user selection of a work object unlocker interface, the user is presented with a second subordinate interface allowing the user to search for and unlock individual work objects, as well as to allow editing of work objects, if desired. At step 814, upon a user's entry of a work object identifier and selection to execute a query based on the identifier, a work object matching the identifier is retrieved and displayed. At step 816, upon the user's selection to unlock the work object, the work object is unlocked. At step 818, if the user has selected to allow editing of work objects, appropriate changes are made to the displayed work object upon a user's entry of new field values in various fields of the work objects. At step 820, a log is updated to reflect the actions taken at steps 814–818.

At step 822, upon a user selection of a work object editor interface, the user is presented with a third subordinate interface which allows the user to search for, retrieve and display individual work objects, to edit field values belonging to the retrieved objects and to perform additional operations on the retrieved objects. If the user has previously retrieved and displayed a work object using another available interface, that work object remains displayed when the work object editor interface is presented. At step 824, if a user enters a work object identifier and makes a selection to execute a query based on the identifier, a work object matching the identifier is retrieved and displayed, replacing any previously displayed work object. At step 826, upon a user entry of new values in various fields of the displayed work object, these values are maintained in a buffer for entry into the work object upon an appropriate user command. At step 828, upon entry by a user of a command, processing of the work object is performed in accordance with the command and with any new values entered by the user, with confirmation being required for commands causing unrecoverable changes, such as entry of new values into the work object. Available commands include updating the work object to include the new values, saving the work object and dispatching it for further processing, locking the work object, unlocking the work object and unlocking the work object and dispatching it for further processing. At step 830, a log is updated to reflect the actions taken at steps 826–828.

At step 832, in response to a user selection of a batch operations manager interface, the user is presented with a fourth subordinate interface allowing the construction and execution of queries defining groups of work objects and the execution of selected operations on those work objects. At step 834, query and command parameters are received from the user. Query parameters may, for example, include filter selections defining whether the query is to apply to queues, work objects or system fields and selections of queues, work classes, queue fields and work object fields to which the query is to apply, parameters specifying the scope of the query as well as user-entered specifications of query parameters. Command parameters may suitably include a selection as to whether the specified command is to be executed or a report provided of the selected actions without the actions being performed. Other available command parameters include format selections and selection of text to be replaced and the new replacement text. At step 836, upon a user's selection of a command, the selected command is executed and a group of work objects processed in accordance with the definitions provided by the query, with the actions taken being defined by the command parameters and the selected command.

Although the steps 802–836 have been presented here as occurring in sequence for ease of description and illustration, it will be recognized that the steps need not occur in sequence, but instead may occur in any order appropriate to user needs and inputs.

While the present invention is disclosed in the context of aspects of a presently preferred embodiment, it will be recognized that a wide variety of implementations may be employed by persons of ordinary skill in the art consistent with the above discussion and the claims which follow below.

What is claimed is:

1. A method of work object management, comprising the steps of:

presenting an interface to a user allowing user specification of a category of work objects, the interface also allowing user identification of one or more operations to be performed on the category of work objects, the operations including searching for and unlocking groups of work objects, searching for and unlocking individual work objects, unlocking of groups of work objects and individual work objects being able to be conducted independently of an origin of a lock of the work objects or ownership of the work objects, searching for and editing individual work objects and searching for and performing specified operations on categories of work objects comprising multiple work objects; and performing the specified operations on work objects included within the specified category.

2. The method of claim 1 wherein the user specification of a category of work objects includes submitting a query specifying one or more characteristics of work objects to be placed in the category.

3. The method of claim 2 further comprising a step of logging each operation performed on one or more work objects.

4. The method of claim 3 wherein the specification may define a location of the object and may additionally define characteristics relevant to the lock status of the object.

5. The method of claim 4, wherein the specification defines all objects having a lock of more than a specified age and wherein the operation includes unlocking all objects having a lock of more than the specified age.

6. The method of claim 5, wherein the specification defines a specific work object and wherein the operation includes editing specified fields of the work object.

7. A work object manager for performing operations on work objects, comprising:

a user interface for receiving user inputs, the user interface allowing a user to construct queries defining a set of work objects on which simultaneous operations are to be performed and to specify an operation to be performed on the set of work objects; and a plurality of operational modules, one or more of the operational modules being operative to perform the specified operation on the defined set of work objects, one of the operational modules being a work object unlocker operative to receive a query identifying an individual work object, to retrieve and display a work object meeting the terms of the query and to unlock the work object upon a user selection, the work object unlocker being capable of unlocking the work object independently of an origin of a lock of the work object or ownership of the work object.

8. A work object manager for performing operations on work objects, comprising:

a user interface for receiving user inputs, the user interface allowing a user to construct queries defining a set of work objects on which simultaneous operations are to be performed and to specify an operation to be performed on the set of work objects; and a plurality of operational modules, one or more of the operational modules being operative to perform the specified operation on the defined set of work objects, one of the operational modules being a work object editor operative to receive a query identifying an individual work object, to retrieve and display a work object meeting the terms of the query and to perform editing of the work object by receiving and accepting user entries changing field values of fields in the work objects, the work object editor being operative, upon a selection by a user, to perform editing of the work objects even if the work objects are designated as locked, independently of an origin of a lock of each of the work objects or ownership of the work objects.

9. A work object manager for performing operations on work objects, comprising:

a user interface for receiving user inputs, the user interface allowing a user to construct queries defining a set of work objects on which simultaneous operations are to be performed and to specify an operation to be performed on the set of work objects; and a plurality of operational modules, one or more of the operational modules being operative to perform the specified operation on the defined set of work objects, one of the operational modules being a batch unlock manager to identify and return work objects based on queries by a user and to unlock identified work objects upon a selection by the user, the batch unlock manager being capable of unlocking an identified work object independently of an origin of a lock of the work object or ownership of the work object, one of the operational modules being a batch operations manager operative to receive a query defining a category of work objects and a command specifying an operation to be performed on work objects meeting the terms of the query and to perform the specified operation upon work objects meeting the terms of the query.

10. A work object manager for performing operations on work objects, comprising:

a user interface for receiving user inputs, the user interface allowing a user to construct queries defining a set of work objects on which simultaneous operations are to be performed and to specify an operation to be performed on the set of work objects; and a plurality of operational modules, one or more of the operational modules being operative to perform the specified operation on the defined set of work objects, one of the operational modules being a batch unlock manager operative to receive a query specifying a range of locations to be searched for work objects, the query further specifying characteristics relating to locking of work objects, the batch unlock manager being operative to return work objects in the specified range of locations and having the specified lock characteristics, the batch unlock manager being further operative to simultaneously unlock the returned work objects upon a selection by the user, the batch unlock manager being capable of unlocking the returned work objects independently of an origin of a lock of each of the work objects or ownership of the work objects.

11. A work object manager for performing operations on work objects, comprising:

a user interface for receiving user inputs, the user interface allowing a user to construct queries defining a set of work objects on which simultaneous operations are to be performed and to specify an operation to be performed on the set of work objects; and a plurality of operational modules operative to perform the specified operation on the defined set of work objects, comprising:

a batch unlock manager operative to receive a query specifying a range of locations to be searched for work objects, the query further specifying characteristics relating to locking of work objects, the batch unlock manager being operative to return work objects in the specified range of locations and having the specified lock characteristics, the batch object manager being further operative to simultaneously unlock the returned work objects upon a selection by the user;

a work object unlocker operative to receive a query identifying an individual work object, to retrieve and display a work object meeting the terms of the query and to unlock the work object upon a user selection;

a work object editor operative to receive a query identifying an individual work object, to retrieve and display a work object meeting the terms of the query, to receive and accept user entries changing field values of fields in the work objects and to change the field values in accordance with the user entries;

a batch operations manager operative to receive a query defining a category of work objects and a command specifying an operation to be performed on work objects meeting the terms of the query and to perform the specified operation upon work objects meeting the terms of the query.

12. The work object manager of claim 11 wherein the user interface includes a plurality of subordinate user interfaces, each subordinate user interface allowing the user to perform a specific category of operations and wherein each subordinate user interface controls one of the operational modules.

13. The work object manager of claim 12, wherein operations performed by the work object manager are logged.

14. The work object manager of claim 13, wherein the lock status of the work object includes that the object has a lock of at least a specified age.

15. The work object manager of claim 14, wherein the user may direct the batch unlock manager to unlock all objects having a lock of more than a specified age.

16. The work object manager of claim 15, wherein the location of the work object may include a queue, a selection of queues, or an entire system employing the work object manager.

17. The work object manager of claim 16, wherein the batch operations manager is operative to receive command parameters relating to an operation to be performed the command parameters controlling execution of the operation.

18. The work object manager of claim 17, wherein the command parameters include a selection determining that a report is to be prepared showing the results of execution of an operation on a defined category of work objects but that the operation is not to be performed.

* * * * *